United States Patent [19]
Angel et al.

[11] Patent Number: 5,252,801
[45] Date of Patent: Oct. 12, 1993

[54] FIXED POINT WELDING GUN

[75] Inventors: Jeffrey R. Angel, Oxford; LeRoy R. Boza, Metamora, both of Mich.

[73] Assignee: Progressive Tool & Industries Co., Southfield, Mich.

[21] Appl. No.: 897,832

[22] Filed: Jun. 12, 1992

[51] Int. Cl.$^5$ .............................................. B23K 11/10
[52] U.S. Cl. ................... 219/86.61; 219/89; 219/90
[58] Field of Search ............ 219/86.25, 86.61, 86.51, 219/89, 90, 91.1; 901/42

[56] References Cited

U.S. PATENT DOCUMENTS

| | | | |
|---|---|---|---|
| 1,980,228 | 11/1934 | Rogers | 219/90 |
| 4,771,160 | 9/1988 | Pitsch et al. | 219/90 |
| 5,036,175 | 7/1991 | Umeda | 219/89 |
| 5,099,099 | 3/1992 | Saito | 219/89 |

Primary Examiner—Geoffrey S. Evans
Attorney, Agent, or Firm—Remy J. VanOphem

[57] ABSTRACT

A resistance welding gun which is adapted to prevent asymmetrical impacting of two or more metal sheets to be welded. The resistance welding gun includes a pair of rotatably connected arms, each of which has a corresponding working end and actuation end. An electrode tip is located at each working end to provide a pair of opposed welding electrodes, while a cylinder is attached to the actuation ends of the arms to provide rotation therebetween. Between the actuation ends there is provided an equalizing mechanism including a crank and a pair of linkages which serve to equalize the movement of the arms about their pivot. In cooperation with the pivot of the arms, the crank establishes a fixed or datum point at which the electrode tips of the resistance welding gun are targeted such that, when properly positioned on opposite sides of the metal sheets, the electrode tips contact the metal sheets substantially simultaneously and apply substantially equal forces to the opposite sides of the metal sheets. As a result, the equalizing mechanism substantially prevents unilateral contacting and asymmetrical impacting by the electrode tips on the metal sheets.

9 Claims, 2 Drawing Sheets

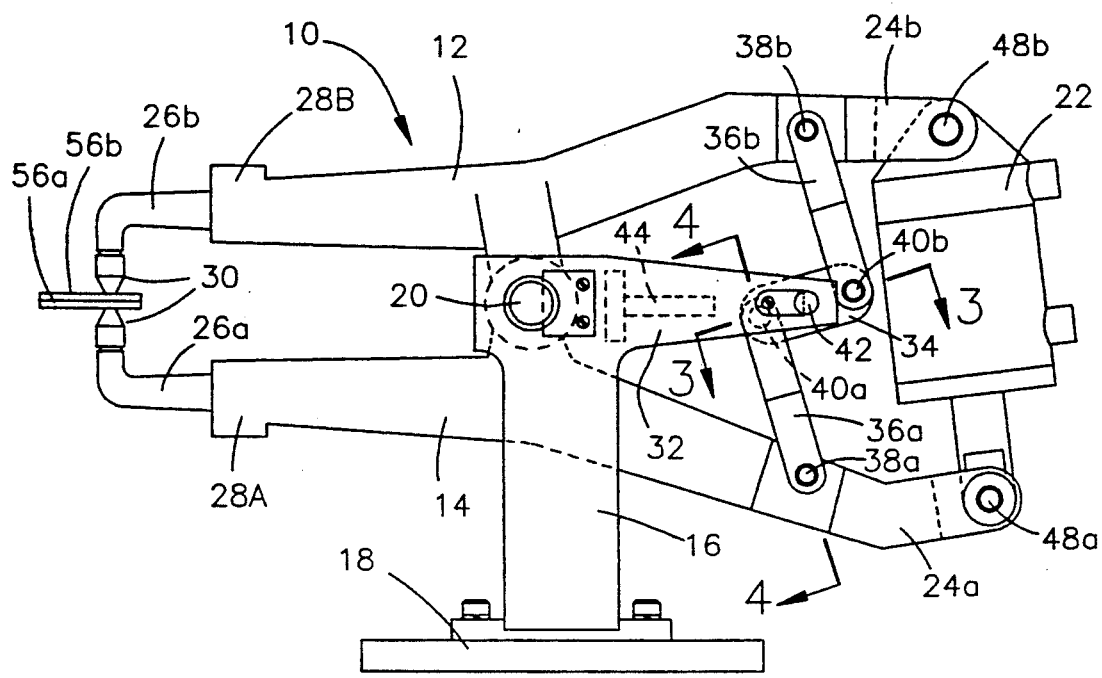
FIG.2
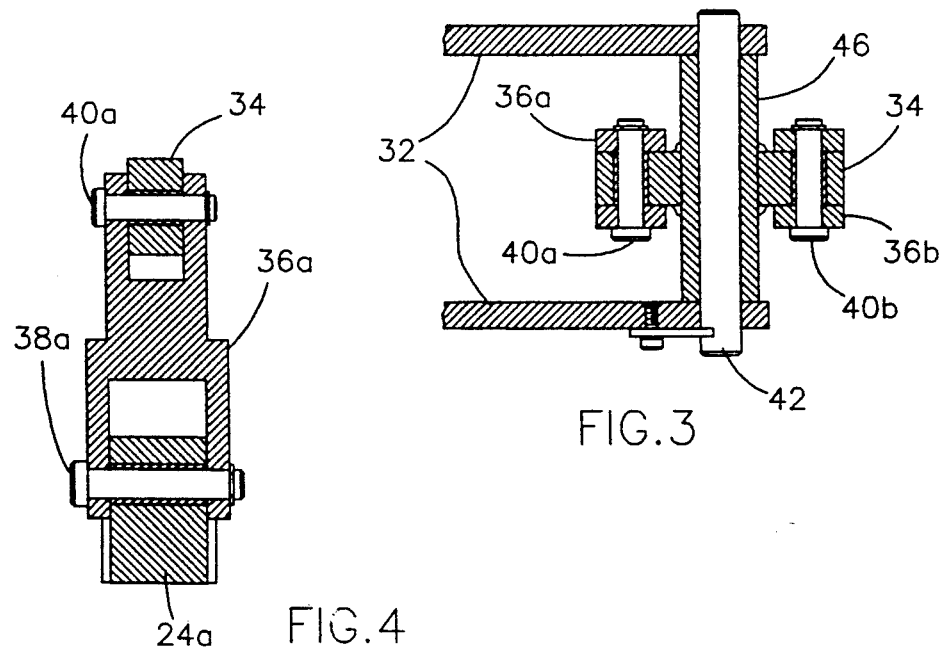
FIG.4
FIG.3

FIXED POINT WELDING GUN

BACKGROUND OF THE INVENTION

1. Field of the Invention

The present invention generally relates to welding guns suitable for use on automated assembly lines. More specifically, this invention relates to a welding gun having a pair of electrode tips and an equalizing linkage mechanism that equalizes the movement of the electrode tips towards a workpiece and the pressure applied by the electrode tips to opposite sides of the workpiece while the workpiece is being welded.

2. Description of the Prior Art

Electric welding guns, and particularly resistance welding guns, are widely used in mass production to join workpieces to form permanent assemblies. Resistance welding guns are especially suited for use on automated automobile assembly lines where body panels, such as doors and hoods, and their support structures are welded together to form subassemblies, which are then welded to the frame or unit construction of an automobile. Unit construction automobile bodies are themselves complex structures of stamped sheet metal sections which must be welded together to form a framework to which the outer body panels are attached.

Resistance welding is a process which, through the application of heat and pressure, coalesces two or more metal sheets or panels, without the use of fluxes or filler metals, to form a permanent joint. The necessary heat is generated by the resistance of the metal sheets to the flow of an electric current through the metal sheets. Conventional resistance welding guns include electrodes which serve as terminals for an electrical circuit. The electrodes typically are formed from copper which is alloyed with such metals as molybdenum and tungsten to be electrically and thermally conductive, while at the same time having sufficient strength to withstand the high application forces associated with holding the metal panels for welding. During the welding process, the electrodes are first brought into contact with opposite sides of the sheets to be welded. An electric current as high as about 20,000 amps is then passed through the electrodes and through the sheets. The magnitude of the electric current must be sufficient, but not excessive, to locally heat and melt the panels so as to fuse the panels to each other between the points where the electrodes make contact with the panels. The current may be direct or alternating, depending upon the particular requirements of the application and the electrode material used.

The resistance welding process conventionally includes the application of pressure to the workpiece with the electrodes. The use of force applied by the electrodes is often beneficial in that it assures a firm contact between the panels being welding, and also assures that proper electrical contact between the panels and the electrodes is made. However, excessive force must be avoided where the workpiece being welded is thin and therefore susceptible to deformation from excessive impact loads or asymmetric clamping loads. This is particularly true in the automotive industry where demands for lighter weight cars has resulted in the use of body panels which traditionally were about 0.035 inches thick, but recently have been as thin as 0.023 inches. The recommended electrode force for welding these panels can be as high as 700 pounds, making deformation a reoccurring problem on automobile assembly lines.

Where large welding guns are used, such as those controlled by robots on an assembly line, it has been conventional practice to construct the welding gun to be self-centering. Typically, this entails a pair of arms pivotably mounted to a base, wherein each of the arms has a first end which is fitted with an electrode. A cylinder is attached to the opposite ends of the arms to rotate the arms relative to each other. In that the arms are free to pivot together on the base, it is intended that one of the electrodes comes into contact with the workpiece prior to the second electrode as the cylinder is extended to bring the electrodes together. Once the first electrode has made contact, it forces the second arm to unilaterally complete the travel of the arms toward the workpiece as the cylinder continues to extend, such that a self-centering capability to the welding gun results. The initial impact is a combination of the force generated by the cylinder and the inertia of the welding gun as it is forced to rotate into position by the first electrode. While this initial impact has not typically caused excessive deformation in the workpiece, with body panels in automobiles getting thinner, even these loads have been found to unacceptably deform the body panels.

Several approaches for minimizing the adverse effect of the clamping force applied by the electrodes have been suggested in the prior art. An early approach taught by U.S. Pat. No. 1,980,228 to Rogers was to provide adjustment to the force applied by a pair of compression springs. Rogers disclosed an eccentric pin which, when rotated, adjusted the gap between a pair of electrodes when the electrodes were subject to the force of the springs urging the electrodes together. However, the welding gun taught by Rogers is not well suited for use on an automated assembly line in that the actual force imposed by the electrodes on the workpiece depends upon possible variations in thicknesses of the workpiece.

A more recent approach is taught in U.S. Pat. No. 4,771,160 to Pitsch et al., which teaches the use of an elastic member which resides between a pair of arms which have a pair of opposed electrodes. The resilient member serves to both impose a force at the electrodes upon the workpiece, while also serving to absorb some of the impact. However, nothing prevents one of the electrodes from impacting the workpiece prior to the other electrode which, as noted above, is a more recently recognized problem.

An approach taught by U.S. Pat. No. 5,036,175 to Umeda is specifically directed to equalizing the force imposed by the two electrodes. Umeda uses an intermediate linkage between a pair of arms to urge one of the arms away from the workpiece under the opposing force of a spring. As a cylinder begins to move the second arm into position, the linkage gradually releases the first arm, allowing the first arm to come into contact with the workpiece under the force imposed by the spring. Again, the movement of each electrode is not the same, allowing one electrode to impact the workpiece unopposed before the other electrode can be brought in to absorb the impact of the first. Finally, U.S. Pat. No. 5,099,099 to Saito teaches a welding gun in which only one arm is rotated while the other is held stationary. Saito uses a pair of linkages to define the movement of the moving arm, but teaches nothing that will ensure that the load will be equalized between the two arms.

From the above discussion, it can be readily appreciated that the prior art does not disclose a resistance welding gun which is adapted to provide both equalized movement and loading of the electrodes immediately preceding and during the time the electrodes come into contact with a workpiece. Nor does the prior art teach or suggest the advantages of impacting a workpiece simultaneously with both electrodes to prevent deformation of the workpiece by a combination of the force generated by the cylinder and the inertia of the welding gun as it is forced to rotate into position by the first electrode to contact the workpiece.

Accordingly, what is needed is an economical method for providing equalized movement and loading of a pair of resistance welding electrodes while the electrodes are brought into contact with the workpiece such that workpiece deformation is not caused by one electrode impacting the workpiece prior to the second, while also ensuring that the loads imposed by the electrodes on the workpiece will be substantially equal throughout the operation of the welding gun.

SUMMARY OF THE INVENTION

According to the present invention there is provided a resistance welding device adapted for use on an automated assembly line. The welding device is capable of equalizing the movement of and the force imposed by a pair of arms which carry a corresponding pair of electrodes. Equalizing the movement of the arms ensures that each electrode will arrive at the workpiece almost simultaneously to prevent unilateral impacting of the workpiece by one of the electrodes. With both electrodes coming into contact almost simultaneously, each electrode serves to absorb some of the impact force exerted by the other electrode, and thus minimizes the likelihood of deforming the workpiece at this time. Equalizing the force exerted by the arms also promotes the ability of the welding device to avoid deformation of the workpiece in that, once contact is made, the electrodes oppose each other with equal force. Accordingly, the welding device of the present invention is well suited for resistance welding workpieces of sheet metal having thicknesses less than the 0.035 inch thickness once commonly used for automobile body panels.

The welding device is constructed to contact opposite sides of the workpiece with a pair of pivotably connected arms. Preferably, the arms are pivotably connected at intermediate points thereof to a base. Each arm has a working end upon which an electrode is mounted. Operatively connected to the arms is a stroking device for pivotably stroking the working ends of the arms together and apart. In that the stroking device is mounted only to the arms, the stroking device applies equal force to each arm, resulting in equal forces imposed by the electrodes on the workpiece.

Also operatively engaged with the arms is an equalizing mechanism for equalizing the movement of the electrodes toward the workpiece and for equalizing the force imposed by the electrodes on the opposite sides of the workpiece as the stroking device strokes the working ends of the arms into contact with the workpiece. By equalizing the movement of the arms, the equalizing mechanism is able to substantially prevent unilateral contacting and asymmetrical loading and impacting by the electrodes upon the workpiece while the electrodes are being rotated into position by the stroking device. In effect, the equalizing mechanism serves as a second reference point which, in cooperation with the pivot connection of the arms, defines a fixed point located between the electrodes towards which the electrodes rotate during operation.

According to a preferred aspect of this invention, the equalizing mechanism is a pair of rotatably interconnected linkages mounted to a datum, such as the base. Each linkage is connected to one of the arms in a manner which synchronizes the movement of each arm with that of the other. By maintaining synchronized movement in the arms, inertial effects of the arms are also equalized such that each arm arrives at the workpiece with a controlled and smooth motion that does not pose the threat of asymmetrically impacting the workpiece. In addition, the linkages are uncomplicated in their construction and operation such that they can be readily adapted to most welding guns employing a pair of pivoting arms. With this construction and arrangement, minimal addition cost and structure is necessary to implement the equalized operational of the present invention. Consequently, little additional space is required to accommodate the equalizing mechanism on an automated assembly line.

In addition, a significant advantage of the present invention is that the welding device does not rely upon a self-centering operation in which the arms are forcibly centered about the workpiece by the act of one electrode impacting the workpiece first, necessitating that the second electrode unilaterally complete the travel of the arms toward the workpiece by the operation of the stroking device. Instead, the welding device may be positioned about a reference datum, the datum being established by a robotic device which positions the panels to be welded at such reference datum. Doing so ensures that the electrodes will arrive at the workpiece simultaneously, thereby preventing one electrode from contacting the workpiece prior to the second electrode.

Accordingly, it is an object of the present invention to provide a welding device for welding a workpiece wherein the welding device includes a pair of electrodes whose movement and force are equalized relative to the workpiece.

It is a further object of the invention that the welding device provide optimal positioning of the electrodes relative to the workpiece prior to the electrodes coming into contact with the workpiece to avoid unilateral impacting of one electrode with the workpiece.

It is still a further object of the invention that the welding device includes an equalizing mechanism which equalizes the movement of the electrodes toward the workpiece while also equalizing the force imposed by the electrodes on the opposite sides of the workpiece as the electrodes are brought into contact with the workpiece.

It is another object of the invention that the equalizing mechanism requires minimal additional structure such that the equalizing device can be readily attached to the welding device.

It is yet another object of the invention that the equalizing mechanism operation to clamp the panels about a datum reference such that panels positioned at such datum reference by a robot device may be welded at such datum reference.

Other objects and advantages of this invention will be more apparent after a reading of the following detailed description taken in conjunction with the drawings provided.

BRIEF DESCRIPTION OF THE DRAWINGS

FIG. 2 is a side view of the welding device of FIG. 1;

FIG. 3 is a cross-sectional of the welding device taken along line 3-3 of FIG. 2; and FIG. 4 is a cross-sectional of the welding device taken along line 4—4 of FIG. 2.

DETAILED DESCRIPTION OF THE PREFERRED EMBODIMENT

Figure 1:
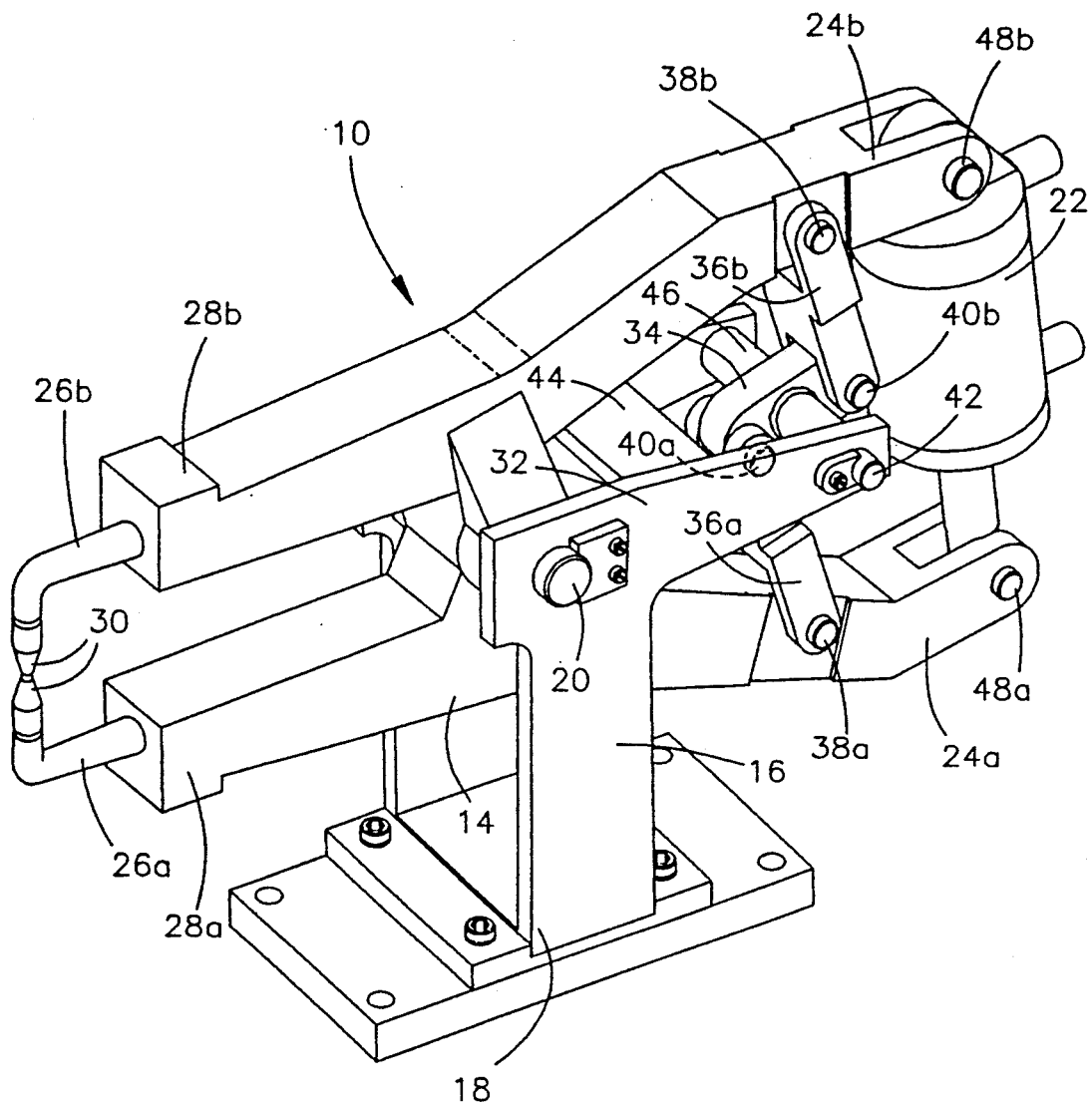
FIG. 1 is a perspective view of a welding device in accordance with the preferred embodiment of this invention.

With reference to FIGS. 1 and 2, there is shown a resistance welding gun 10 in accordance with the preferred embodiment of the present invention. The resistance welding gun 10 includes a pair of electrode tips 30 mounted on a pair of upper and lower arms 12 and 14, respectively, which are pivotably mounted to a base 16. The electrode tips 30 serve as terminals for an electrical circuit (not shown) which generates the current by which two or more metal sheets 56a and 56b are welded. The magnitude of the electric current must be sufficient to locally heat and melt the metal sheet 56a and 56b so as to coalesce the metal sheets 56a and 56b at the localized point where the electrode tips 30 make contact with the metal sheets 56a and 56b. The electrode tips 30 can be formed from any suitable material, such as copper alloyed with molybdenum and tungsten to be electrically and thermally conductive. The electrode tips 30 must also have sufficient strength to withstand the high application forces associated with resistance welding. In automotive applications, such loads are often as large as about 700 pounds, though resistance welding loads may be as large as 2000 pounds for some applications.

In that the resistance welding gun 10 of the present invention is particularly directed to use on an automotive assembly line in which the metal sheets 56a and 56b are as thin as 0.023 inch, the application of such a high force with the electrode tips 30 poses the potential of deforming the metal sheets 56a and 56b unless the movement of the electrode tips 30 towards the metal sheets 56a and 56b is carefully controlled. Accordingly, it is a particular feature of the resistance welding gun 10 to prevent the application of an asymmetrical force upon the metal sheets 56a and 56b.

To accomplish this object, the resistance welding gun 10 includes securing the upper and lower arms 12 and 14 to be base 16 at two fixed points. The first is a central pivot 20 about which the upper and lower arms 12 and 14 are permitted to rotate. The second is provided by an equalizing mechanism, which is described in detail below. Each of the lower and upper arms 14 and 12 includes a working end 28a and 28b, respectively, at which an electrode shank 26a and 26b is mounted. The electrode shanks 26a and 26b may be water cooled in a manner which is conventional in the art.

Opposite the working end 28b and 28a of each of the upper and lower arms 12 and 14 is a corresponding actuation end 24b and 24a. Each actuation end 24a and 24b has a yoke formed thereon upon which a stroking device, such as an air cylinder 22, is mounted by a pair of pins 48a and 48b. The cylinder 22 is not supported by anything other than the upper and lower arms 12 and 14, and therefore imposes equal loads on the upper and lower arms 12 and 14 when the cylinder 22 is either extended or retracted. In addition, the rate of rotation of the upper and lower arms 12 and 14 is governed by the rate at which the cylinder 22 is stroked. Preferably, the cylinder 22 includes a large diameter piston (not shown) such that suitable loads can be obtained with the use of about 75 psi air pressure which is typically available in a manufacturing facility.

The base 16 is mounted to a suitable support 18 and, as more clearly seen in FIG. 1, is formed from a pair of inverted L-shaped members. The central pivot 20 and a reinforcement weldment 44 provide rigidity to the base 16 so as to be able to withstand the rigorous operation of the resistance welding gun 10. The reinforcement weldment 44 extends along a horizontal leg 32 of the base 16 to specifically provide rigidity to the horizontal leg 32. The horizontal leg 32 is oriented with respect to the upper and lower arms 12 and 14 such that, when the upper and lower arms 12 and 14 are horizontal, the horizontal leg 32 is substantially equidistant from the upper and lower arms 12 and 14.

Supported by the horizontal leg 32 is the aforementioned equalizing mechanism of the present invention. The equalizing mechanism includes a crank 34 which is rotatably mounted on a bushing 46 which is supported on the horizontal leg 32 by a pin 42. The axis of rotation of the crank 34 is substantially parallel to the axis of rotation of the upper and lower arms 12 and 14. As seen in FIGS. 2 and 3, the crank 34 is located between the L-shaped members of the horizontal leg 32 such that it is located equidistant between the upper and lower arms 12 and 14 and between the central pivot 20 and the actuation ends 24b and 24a of the upper and lower arms 12 and 14. The pin 42 and bushing 46 are centrally mounted in the crank 34, and a pair of pins 40a and 40b are radially spaced an equal distance on diametrically opposite sides of the pin 42.

With continued reference to FIGS. 2 and 3, a pair of upper and lower linkages 36b and 36a are attached to the crank 34 by the pins 40b and 40a, respectively. As best seen in FIG. 4, the upper and lower linkages 36b and 36a are substantially identical, elongate members which terminate at each end with a yoke. The upper and lower linkages 36b and 36a are pivotably attached to the upper and lower arms 12 and 14 with a corresponding pair of pins 38b and 38a. The upper and lower linkages 36b and 36a are substantially of equal length such that, in conjunction with the placement of the crank 34 equidistant between the upper and lower arms 12 and 14, the upper and lower linkages 36b and 36a dictate that the upper and lower arms 12 and 14 rotate at the same rate in opposite directions about the central pivot 20.

In effect, the crank 34 and the upper and lower linkages 36b and 36a serve to equalize the movement of the electrode tips 30 toward the metal sheets 56a and 56b and equalize the force imposed by the electrode tips 30 on the opposite sides of the metal sheets 56a and 56b as the cylinder 22 strokes the electrode tips 30 into contact with the metal sheets 56a and 56b. As a result, the equalizing mechanism substantially prevents unilateral contacting and asymmetrical loading and impacting by the electrode tips 30 on the metal sheets 56a and 56b while the electrode tips 30 are being rotated into position by the cylinder 22. As previously noted, the axis of rotation of the crank 34, as defined by the pin 42, and the central pivot 20 secure the upper and lower arms 12 and 14 to the base 16 at two fixed points. As such, there is defined a fixed or datum point in space which is immediately between and equidistant from the electrode tips 30 towards which the electrode tips 30 will rotate during operation of the resistance welding gun 10. This fixed point can be relocated only by repositioning the entire resistance welding gun 10.

In operation, the metal sheets 56a and 56b are brought between the electrode tips 30 to a fixed datum point by any suitable positioning device, i.e., a robot arm, while the cylinder 22 is retracted such that the electrode tips 30 are at their furthest distance from each other. As noted above, the fixed or datum point of the resistance welding gun 10 lies immediately between and equidistant from the electrode tips 30.

Once the resistance welding gun 10 is properly positioned, air is provided to extend the cylinder 22 for rotating the electrode tips 30 together. By operation of the crank 34 and the upper and lower linkages 36b and 36a, each arm 12 and 14 rotates at the same rate about the central pivot 20 such that the electrode tips 30 arrive at the metal sheets 56a and 56b at substantially the same time, thereby preventing one electrode tip 30 from impacting the metal sheets 56a and 56b prior to the other electrode tip 30 arriving. Because the resistance welding gun 10 has been prepositioned to locate the metal sheets 56a and 56b at the fixed point, it is not necessary or even desirable that the electrode tips 30 seek their own center by unilaterally contacting the metal sheets 56a and 56b. Once in contact, the electrode tips 30 deliver the full load capability of the cylinder 22 and sufficient current is sent through the electrode tips 30 through suitable controls, connectors and cables (not shown) which are electrically connected to a suitable electrical source (not shown). After the weld is made, the cylinder 22 is again retracted which forces the upper and lower arms 12 and 14 to move the electrode tips 30 away from the metal sheets 56a and 56b.

From the above, it can be seen that a significant advantage of the resistance welding gun 10 of the present invention is that each of the upper and lower linkages 36b and 36a is connected to one of the upper and lower arms 12 and 14 in a manner which synchronizes the movement of the upper and lower arms 12 and 14. By maintaining synchronized movement in the upper and lower arms 12 and 14, each of the electrode tips 30 reaches the metal sheets 56a and 56b with a controlled and smooth motion that does not pose the threat of asymmetrical impacting of the metal sheets 56a and 56b. Moreover, with both electrode 30 coming into contact almost simultaneously, each electrode tip 30 serves to absorb some of the impact force exerted by the other electrode tip 30, and thus minimizes the likelihood of deforming the metal sheets 56a and 56b at this time. Consequently, the resistance welding gun 10 is particularly suited for welding thin metal sheets, such as that used on automated automobile assembly lines, in that the resistance welding gun 10 is capable of minimizing the risk of impacting one of the metal sheets 56a and 56b with a sufficient unopposed force to plastically deform it.

Another significant advantage of the present invention is that the resistance welding gun 10 does not rely upon the self-centering operation of the prior art in which a pair of arms are forcibly centered about a workpiece by the act of one electrode impacting the workpiece first. As previously noted, similar resistance welding guns of the prior art impose an initial impact which is a combination of the force generated by the cylinder and the inertia of the welding gun as it is forced to rotate into position by the first electrode. In contrast, the resistance welding gun 10 of the present invention is positioned relative to a datum or fixed point, at which point the metal sheets 56a and 56b will be positioned by a robot device. The electrode tips 30 are initially positioned relative to the metal sheets 56a and 56b so as to coincide the metal sheets 56a and 56b with the fixed point established between the electrode tips 30 by the central pivot 20 and the crank 34. The electrode tips 30 arrive at the metal sheets 56a and 56b simultaneously, thereby preventing one electrode from contacting the metal sheets 56a and 56b prior to the second electrode.

In addition, the advantages of the resistance welding gun 10 can be realized with minimal additional structure and can be readily adapted to a conventional welding gun which employs a pair of pivotably connected arms, such as the upper and lower arms 12 and 14. The equalizing mechanism resides between the upper and lower arms 12 and 14 such that additional space is not required to accommodate the crank 34 and the upper and lower linkages 36b and 36a.

Accordingly, the present invention provides a resistance welding gun 10 which is adapted to prevent the application of an asymmetrical force upon the metal sheets 56a and 56b. The crank 34 and the upper and lower linkages 36b and 36a serve to equalize the movement of the electrode tips 30 toward the metal sheets 56a and 56b so as to equalize the force imposed by the electrode tips 30 on the opposite sides of the metal sheets 56a and 56b as the electrode tips 30 are brought into contact with the metal sheets 56a and 56b. The equalizing mechanism substantially prevents unilateral contacting and asymmetrical loading and impacting by the electrode tips 30 on the metal sheets 56a and 56b while the electrode tips 30 are being rotated into position by the cylinder 22. In cooperation with the central pivot 20, the crank 34 establishes the fixed point at which the electrode tips 30 of the resistance welding gun 10 are targeted.

While the invention has been described in terms of a preferred embodiment, it is apparent that other forms could be adopted by one skilled in the art. Accordingly, the scope of the invention is to be limited only by the following claims.

What is claimed is:

1. A welding device for contacting opposite sides of a workpiece for welding said workpiece, said welding device comprising:
   a base;
   a pair of arms pivotably mounted to said base and positioned along side each other, each arm of said pair of arms having a working end;
   an electrode disposed at each said working end of each arm of said pair of arms;
   stroking means operatively engaged with said pair of arms for moving said working ends together and apart;
   means operatively engaged with said pair of arms for equalizing movement of said electrodes toward said workpiece and for equalizing pressure imposed by said electrodes on said opposite sides of said workpiece when said stroking means strokes said working ends together, said equalizing means comprising a pair of rotatably interconnected linkages mounted to said base and connected to said pair of arms and said pair of rotatably interconnected linkages further defining an axis of rotation intermediate between and normal to said pair of arms; and whereby said equalizing means substantially prevents unilateral contacting and asymmetric loading and impacting by said electrodes upon said workpiece while said electrodes are being moved into position by said stroking means.

2. The welding device of claim 1 wherein said pair of arms are pivotably connected at an intermediate point thereof.

3. The welding device of claim 1 wherein each arm of said pair of arms has an actuation end disposed opposite from said working end, said stroking means being attached to each of said actuation ends.

4. The welding device of claim 3 wherein said equalizing means is located between said actuation ends.

5. A welding device for contacting opposite sides of a workpiece for welding said workpiece, said welding device comprising:
   a base;
   a pair of arms pivotably mounted to said base and further pivotably connected at an intermediate point on each arm of said pair of arms, each arm of said pair of arms having a working end and an oppositely disposed actuation end, said pair of arms further being pivotably mounted to said base;
   an electrode disposed at said working end of each arm of said pair of arms;
   stroking means connected to said actuation ends for pivotably stroking said working ends together and apart; and
   means located between said pair of arms for equalizing movement of said electrodes toward said workpiece and for equalizing pressure imposed by said electrodes on said opposite sides of said workpiece when said stroking means strokes said working ends together, said equalizing means further comprising a pair of rotatably interconnected linkages attached to said base and connected to said pair of arms;
   whereby said equalizing means substantially prevents asymmetric loading and impacting by said electrodes upon said workpiece while said electrodes are rotated into position by said stroking means.

6. The welding device of claim 5 wherein said pair of rotatably interconnected linkages define an axis of rotation intermediate between and normal to said pair of arms.

7. The welding device of claim 5 wherein said equalizing means is located between said actuation ends.

8. The welding device of claim 5 wherein said stroking means is a cylinder pivotably attached to each said actuation ends.

9. A welding apparatus for positioning a pair of electrodes on opposite sides of a workpiece such that said pair of electrodes simultaneously contact and equally load said opposite sides of said workpiece, said welding apparatus comprising:
   a base;
   a pair of arms pivotably connected to said base at an intermediate point on each arm of said pair of arms, each arm of said pair of arms having a working end and an oppositely disposed actuation end, a corresponding one of said pair of electrodes being disposed at a corresponding one of said working ends;
   stroking means connected to said actuation ends for pivotably stroking said working ends together and apart;
   a crank rotatably attached to said base, said crank having an axis of rotation intermediate between and normal to said pair of arms;
   a pair of linkages attached to said crank, a first of said pair of linkages being pivotably attached to a first of said pair of arms and a second of said pair of linkages being pivotably attached to a second of said pair of arms, said pair of linkages causing substantially equal movement of said pair of electrodes toward said workpiece and equal pressure imposed by said pair of electrodes on said opposite sides of said workpiece when said stroking means strokes said working ends together; and
   whereby said pair of electrodes are positioned on opposite sides of said workpiece to properly position said pair of electrodes relative to said workpiece such that said pair of electrodes face and are equally spaced from a corresponding one of said opposite sides of said workpiece and such that said pair of linkages substantially promote symmetric loading and impacting by said pair of electrodes upon said workpiece while said pair of electrodes are being rotated into position by said stroking means.

* * * * *

UNITED STATES PATENT AND TRADEMARK OFFICE
CERTIFICATE OF CORRECTION

PATENT NO. : 5,252,801
DATED : October 12, 1993
INVENTOR(S) : Jeffery R. Angel and LeRoy R. Boza It is certified that error appears in the above-identified patent and that said Letters Patent is hereby corrected as shown below:

Column 4, line 20, delete "addition" and insert ---- additional ----.

Column 4, line 21, delete "operational" and insert ---- operation ----.

Column 4, line 61, delete "operation" and insert ---- operates ----.

Column 5, line 24, delete "sheet" and insert ---- sheets ----.

Column 5, line 50, delete "be" and insert ---- the ----.

Column 7, line 6, after "fixed" insert ---- or ----.

Column 7, line 47, after "electrode" insert ---- tips ----.

Signed and Sealed this

Fifteenth Day of March, 1994

Attest:

BRUCE LEHMAN

Attesting Officer    Commissioner of Patents and Trademarks